United States Patent [19]

Takaguchi

[11] Patent Number: 5,253,975
[45] Date of Patent: Oct. 19, 1993

[54] CAR LOADING APPARATUS

[75] Inventor: Hiroyuki Takaguchi, Nagasaki, Japan

[73] Assignee: Taiyo Seiki Iron Works Co., Ltd., Osaka, Japan

[21] Appl. No.: 794,620

[22] Filed: Nov. 15, 1991

Related U.S. Application Data

[63] Continuation of Ser. No. 640,623, Dec. 21, 1990, abandoned.

[30] Foreign Application Priority Data

| Dec. 21, 1989 | [JP] | Japan | 1-333586 |
| Jun. 21, 1990 | [JP] | Japan | 2-164981 |
| Jul. 4, 1990 | [JP] | Japan | 2-179286 |
| Oct. 24, 1990 | [JP] | Japan | 2-289904 |

[51] Int. Cl.$^5$ ............................................. B60P 3/08
[52] U.S. Cl. .................................. 414/786; 410/26; 410/11; 414/498
[58] Field of Search .................... 410/2, 3, 4, 10, 11, 410/23, 24, 24.1, 25, 26, 29; 414/229, 230, 347, 400, 498, 608, 786

[56] References Cited

U.S. PATENT DOCUMENTS

| 2,750,225 | 6/1956 | Mettelal, Jr. | 410/26 X |
| 3,563,181 | 2/1971 | Mietla | 410/11 |
| 3,566,804 | 3/1971 | Mietla | 410/11 |
| 3,801,177 | 4/1974 | Fylling | 410/11 |
| 3,853,347 | 12/1974 | Harold | 410/11 |
| 3,854,424 | 12/1974 | Blunden et al. | 410/11 |
| 4,124,119 | 11/1978 | Nordstrom | 410/13 X |
| 4,786,222 | 11/1988 | Blodgett | 410/29 |
| 4,801,229 | 1/1989 | Hanada et al. | 410/26 |
| 4,911,590 | 3/1990 | Green | 410/26 |
| 4,917,557 | 4/1990 | Kato et al. | 410/24 |
| 4,963,067 | 10/1990 | Gearin et al. | 414/498 X |

FOREIGN PATENT DOCUMENTS 3443662  6/1986  Fed. Rep. of Germany ........ 410/24

OTHER PUBLICATIONS

Buck Equipment Corporation.

Primary Examiner—Michael S. Huppert
Assistant Examiner—James T. Eller, Jr.
Attorney, Agent, or Firm—Wenderoth, Lind & Ponack

[57] ABSTRACT

A method and apparatus are disclosed for loading a container with cars. A car loading apparatus includes a box shaped frame having a rectangular base frame, side frames, end frames and a top frame. It is assembled outside the container. Two cars are loaded onto the frame in two tiers, one on the base frame and the other on the top frame. The upper car is lashed to the frame to compress its suspension springs to such an extent that its top is lower than the upper frame of the entrance of the container. Rollers are mounted on the bottom of the box frame so that the frame thus loaded with two cars can be pushed into the container with human hands. Alternatively, the car-loading frame may be formed of a rectangular base frame and two gate-shaped gantry frames fixedly or removably mounted on the base frame.

7 Claims, 16 Drawing Sheets

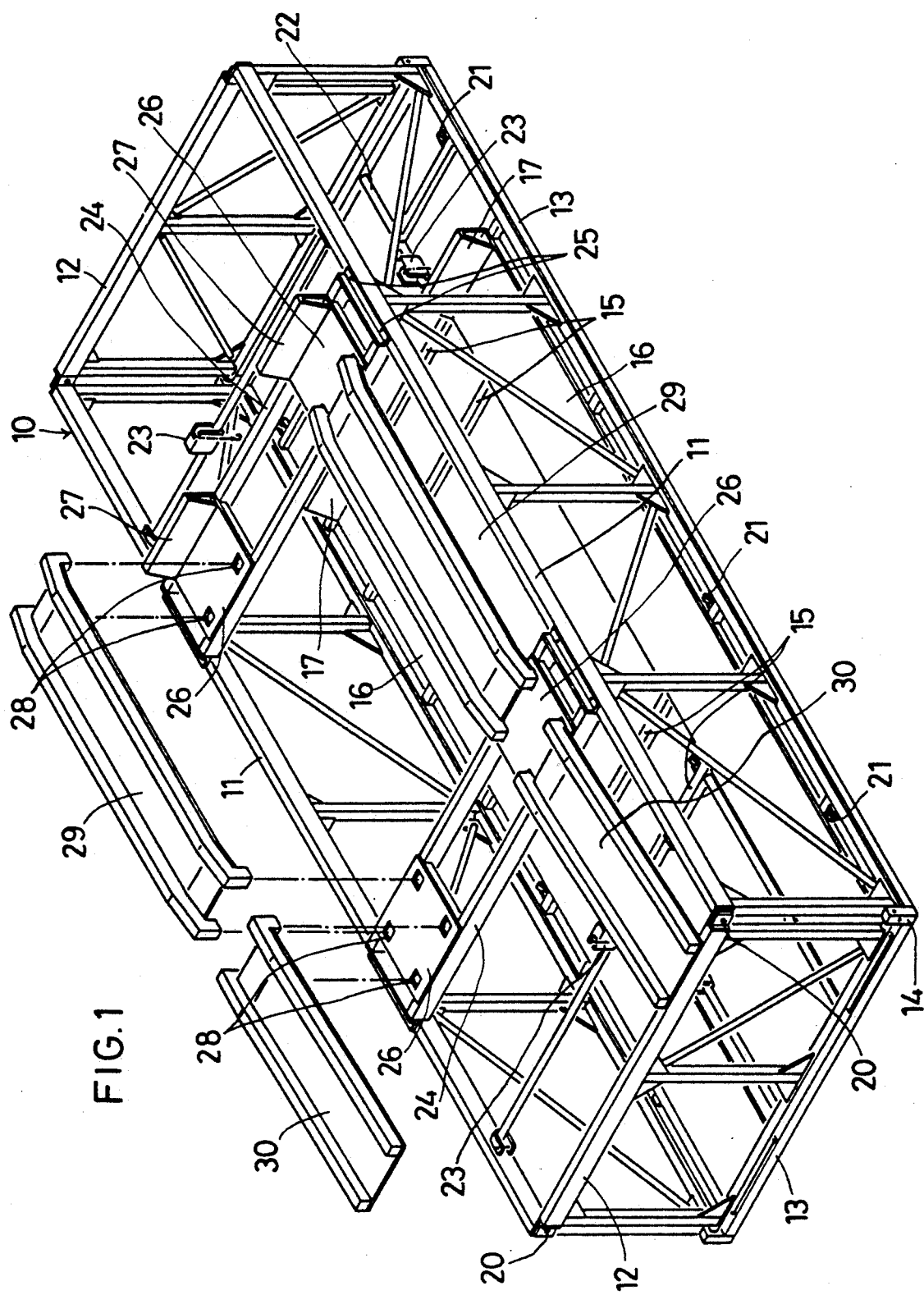

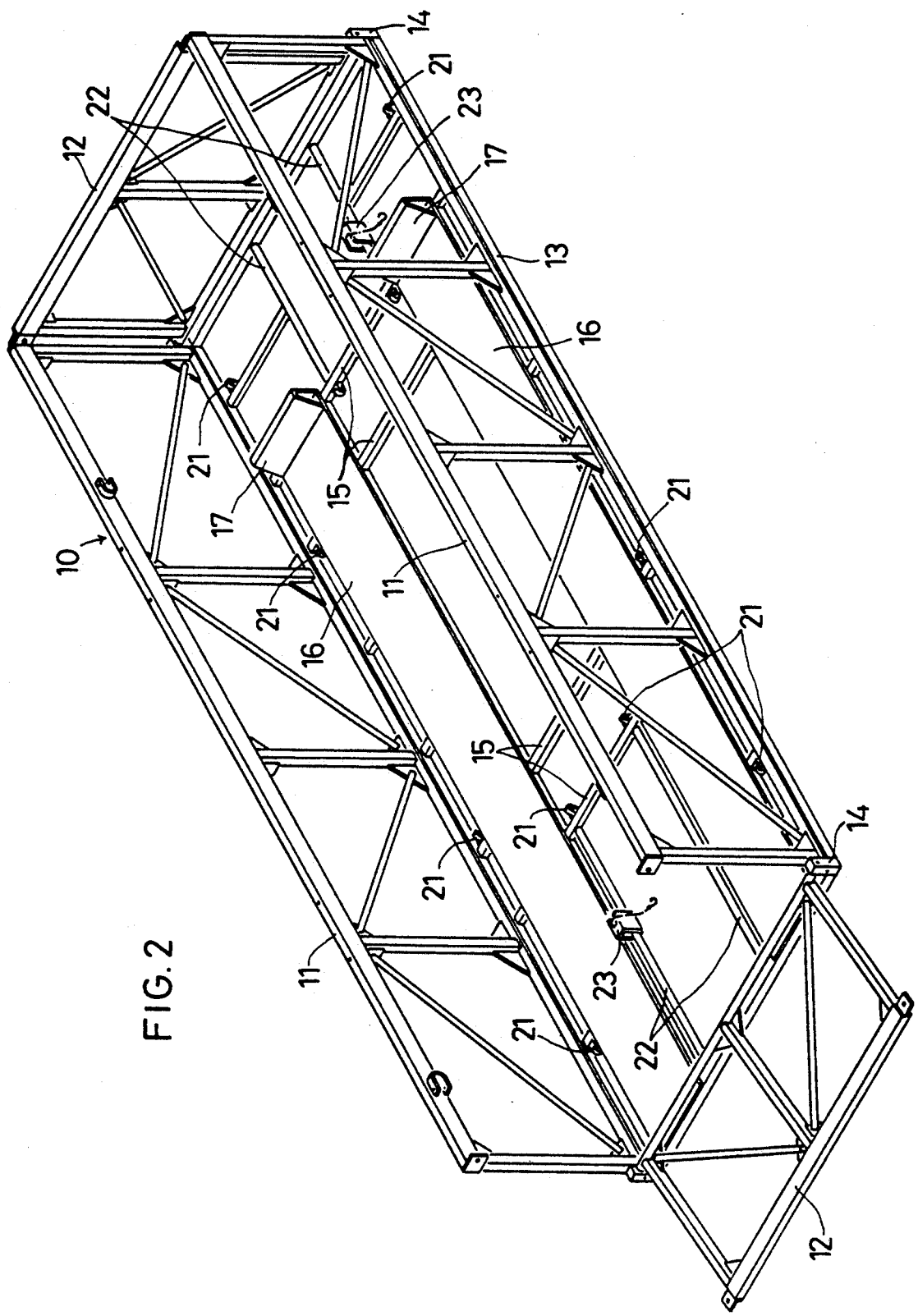

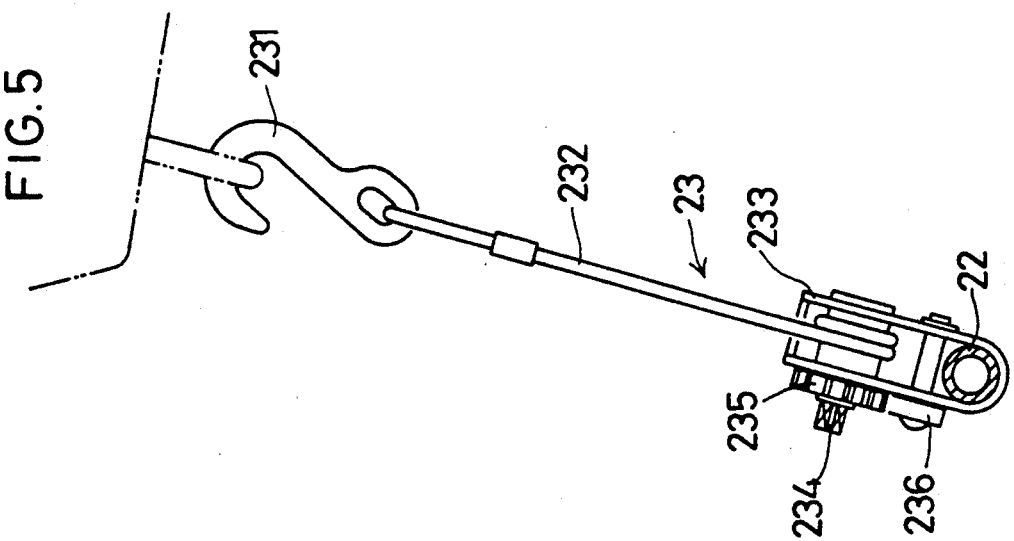
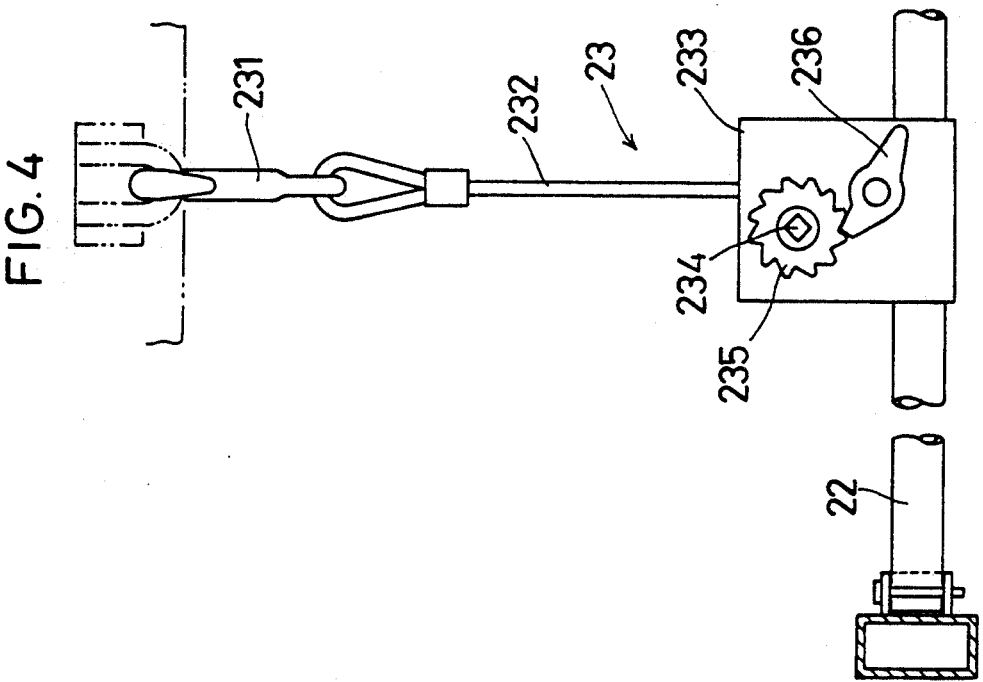
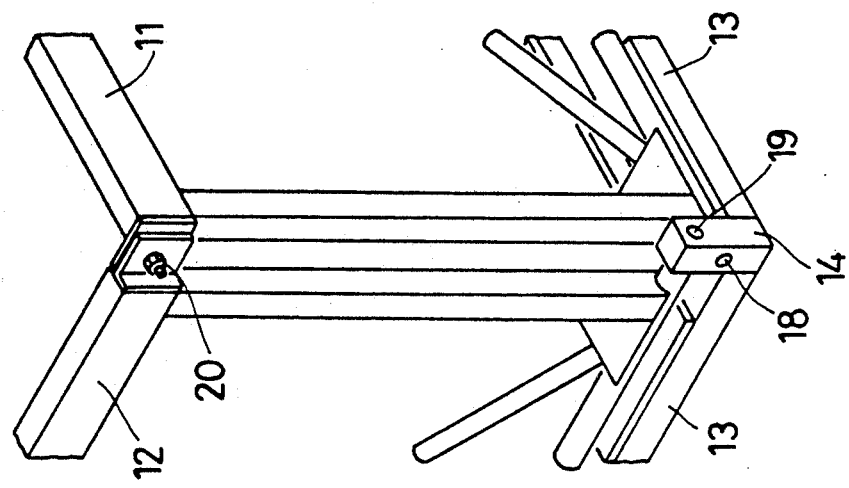

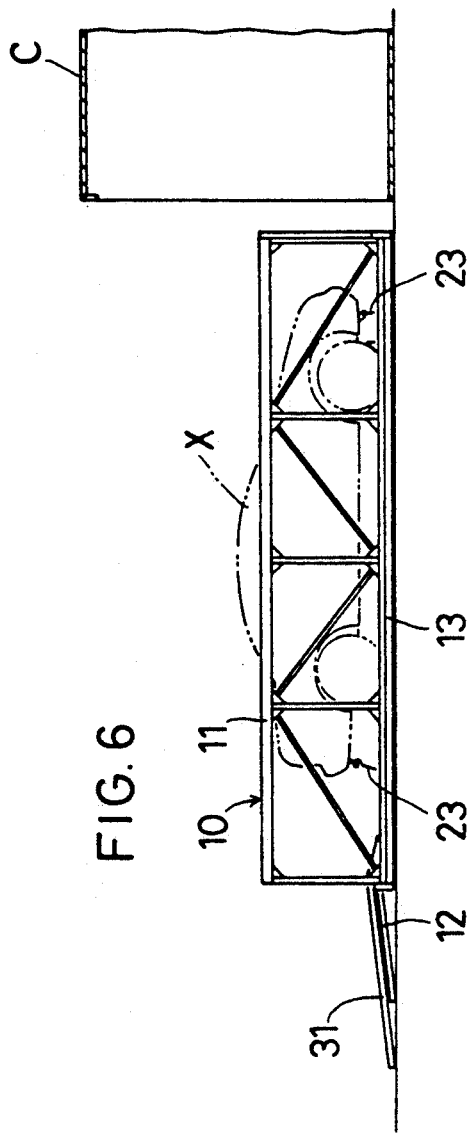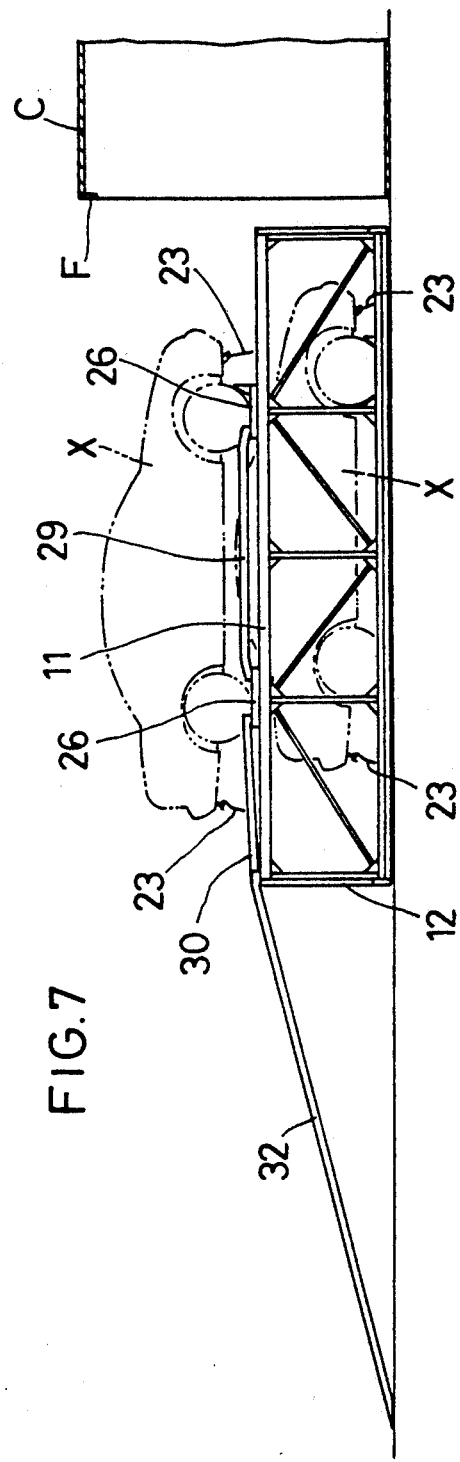

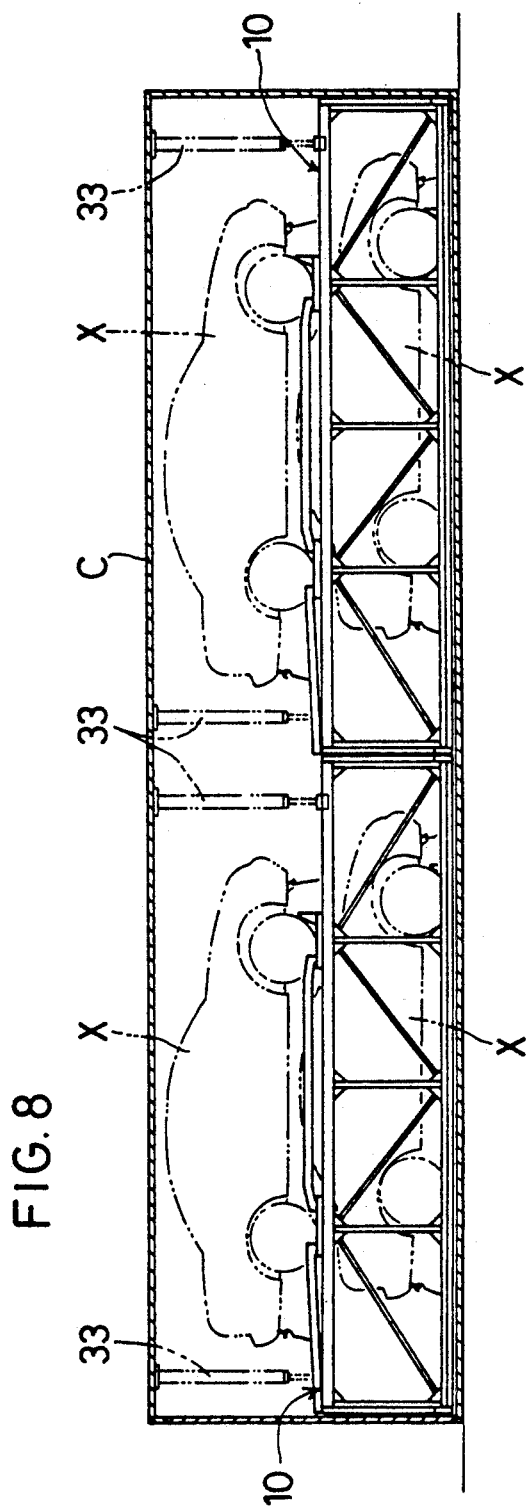

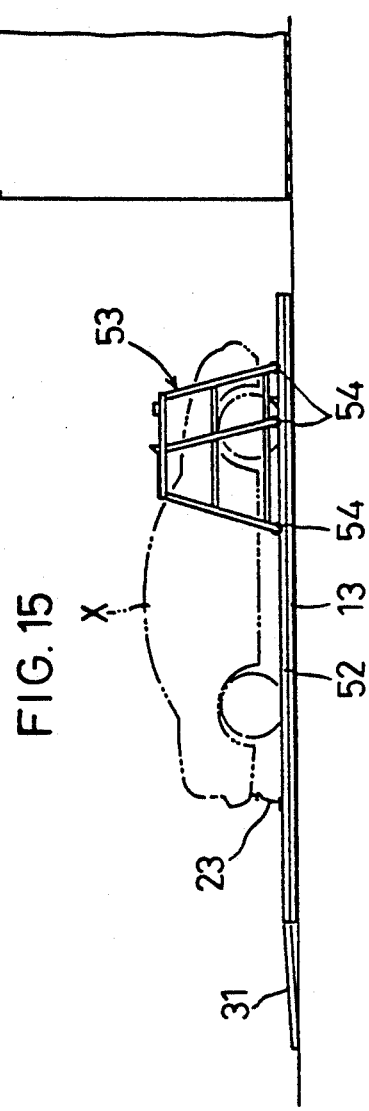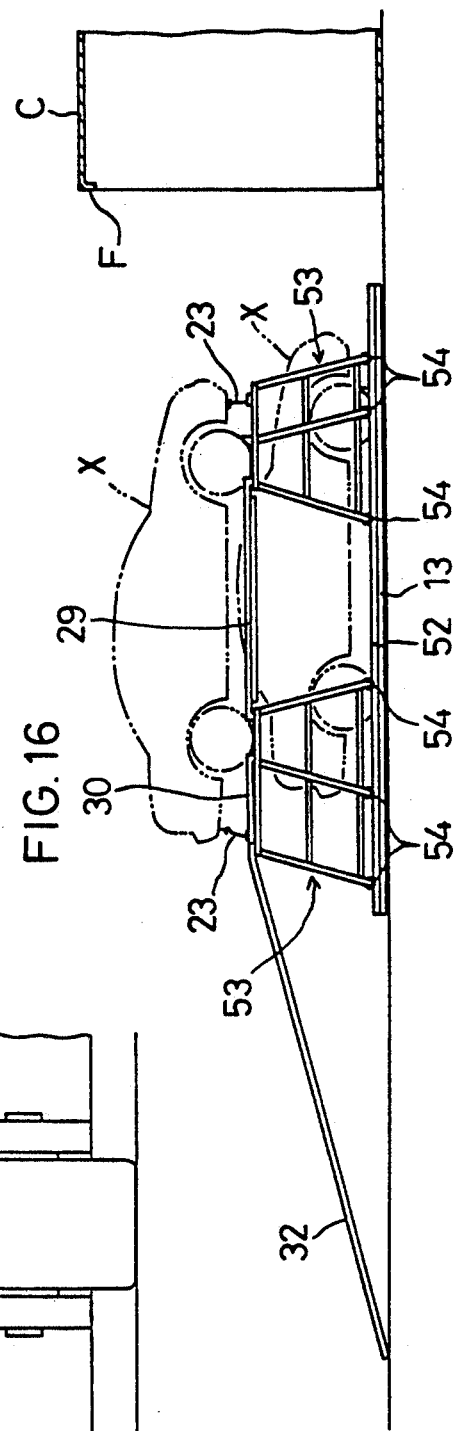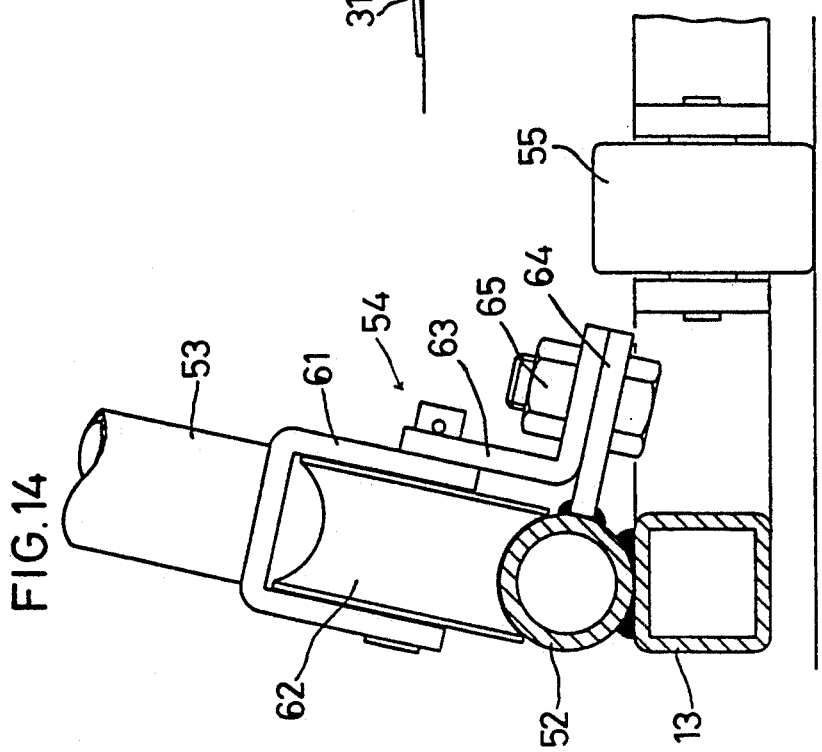

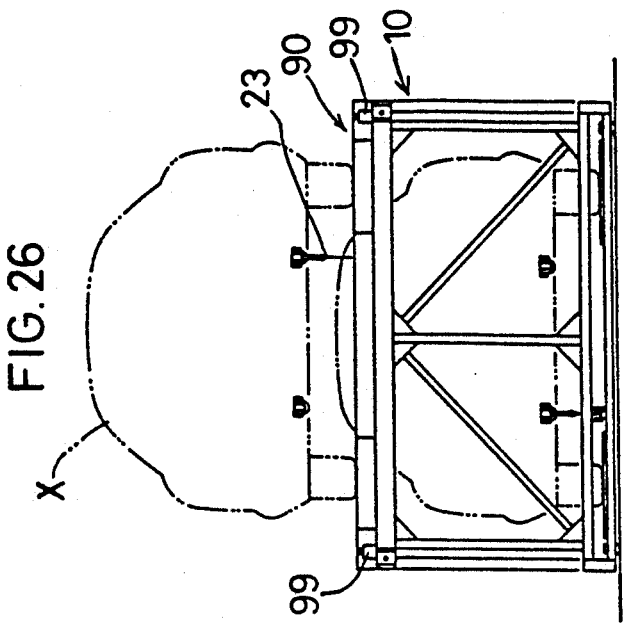
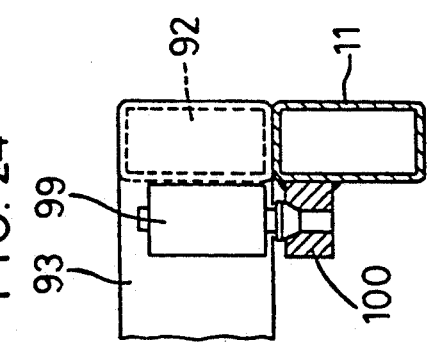
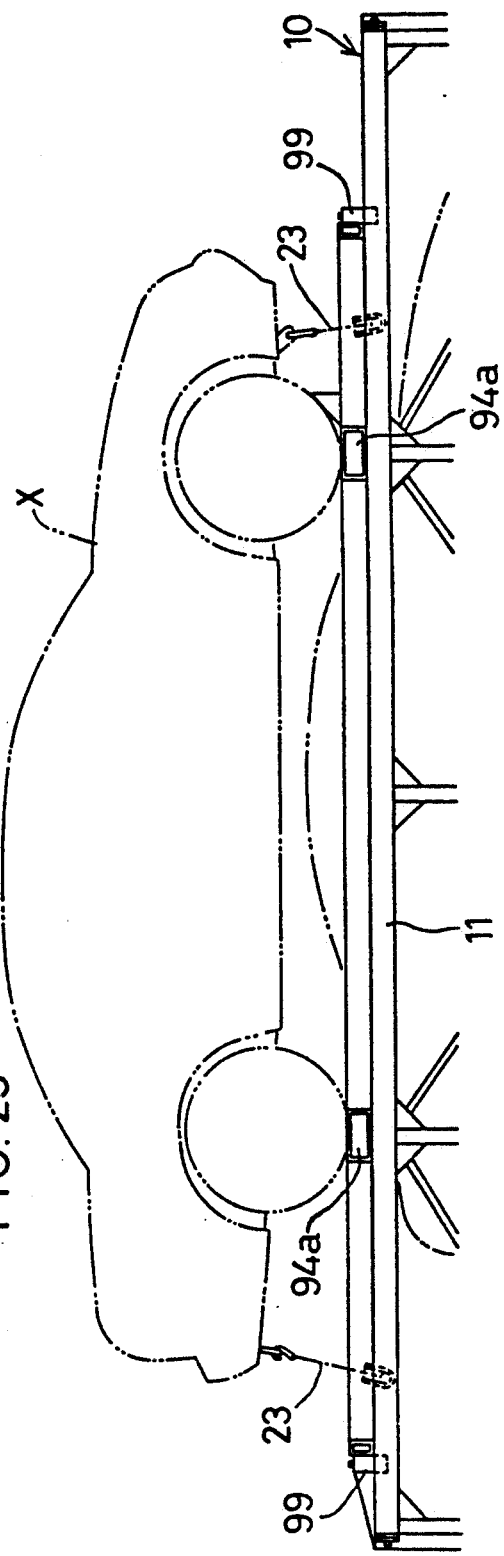

CAR LOADING APPARATUS

This application is a continuation of now abandoned application Ser. No. 07/640,623 filed on Dec. 21, 1990, now abandoned.

BACKGROUND OF THE INVENTION

The present invention relates to a car loading apparatus used for loading a plurality of automobiles in two tiers into a container for transportation.

Heretofore, a container for loading automobiles was used exclusively for automobiles. Such a container is provided inside with car-loading apparatus comprising a plurality of sets of load-supporting columns and lifts.

Because such a prior art car-loading apparatus is fixedly mounted in a container, the container cannot be used for various different purposes. Further, loading of automobiles requires a lot of time and trouble. Also, it is very difficult and troublesome for a driver to open the door of the automobile and get out of it after moving it into a container and to fix it in position in the container.

Moreover, since the lift of the car-loading apparatus requires driving means for driving itself to put automobiles in two tiers, the loading apparatus has a very complicated structure.

One solution for the above-described various problems is to put a car in a loading apparatus comprising a box-shaped frame having suitable length, width and height for accommodating a car, to put another car on this loading apparatus and to carry it into a container.

But when moving this loading apparatus into a container with two cars piled one upon the other, its whole height is so large that the car on the upper tier will touch an upper frame of an entrance to the container, because it is located a little lower than the effective height of the interior of the container, thus making it impossible to move the apparatus into the container.

SUMMARY OF THE INVENTION

It is an object of this invention to provide a car loading apparatus which obviates the abovesaid shortcomings.

Two cars can be mounted on the car loading apparatus according to this invention, one on a car-mounting frame of a base frame and the other on a car-mounting frame placed on a box frame.

When mounting cars on the lower and upper decks of the loading apparatus, short and long ramps are set up against the box frame, respectively. Cars are moved up the ramps onto the lower and upper decks of the car loading apparatus and fixed at predetermined positions.

More specifically, a first car is driven onto the lower deck with the rear rectangular frame of the box frame held open. Then after mounting the connecting frame and the car-mounting frame necessary for carrying a car on the upper deck, a second car is driven onto the upper deck.

Thereafter, the cars are lashed to the box frame with lashing devices. At that time, the lashing devices for the car on the upper deck are pulled with a force greater than would be necessary for holding the car in place in order to lower the height of the car on the upper deck by compressing its suspension springs and tires so that it can pass through the entrance of the container without hitting its top frame.

After lashing the cars, the entire apparatus is pushed into the container by human hands.

The car loading apparatus according to the present invention is sufficiently rigid and light in weight. Cars can be loaded in two tiers. This apparatus can be moved easily by human hands with two cars loaded. Its entire height when two cars are mounted can be lowered sufficiently so that the car on the upper deck can pass through the entrance of the container without hitting its top frame.

BRIEF DESCRIPTION OF THE DRAWINGS

Other features and objects of the present invention will become apparent from the following description taken with reference to the accompanying drawings, in which:

FIG. 1 is a schematic perspective view of a first embodiment of a car loading apparatus of this invention;

FIG. 2 is a perspective view showing the first embodiment with its accessory parts removed;

FIG. 3 is a view showing a corner portion of a box frame of the first embodiment;

FIGS. 4 and 5 are views of a lashing device;

FIGS. 6 to 8 are views showing how a container is loaded with cars;

FIG. 14 is a sectional view of a roller-carrying fixing device;

FIGS. 15 and 16 are views showing how cars are loaded;

FIG. 24 is a view showing how engaging members are engaged together;

FIG. 25 is a side view showing how a car is loaded on an upper deck; and

FIG. 26 is a side view as seen from one end of FIG. 25.

DETAILED DESCRIPTION OF THE INVENTION

Figure 9:
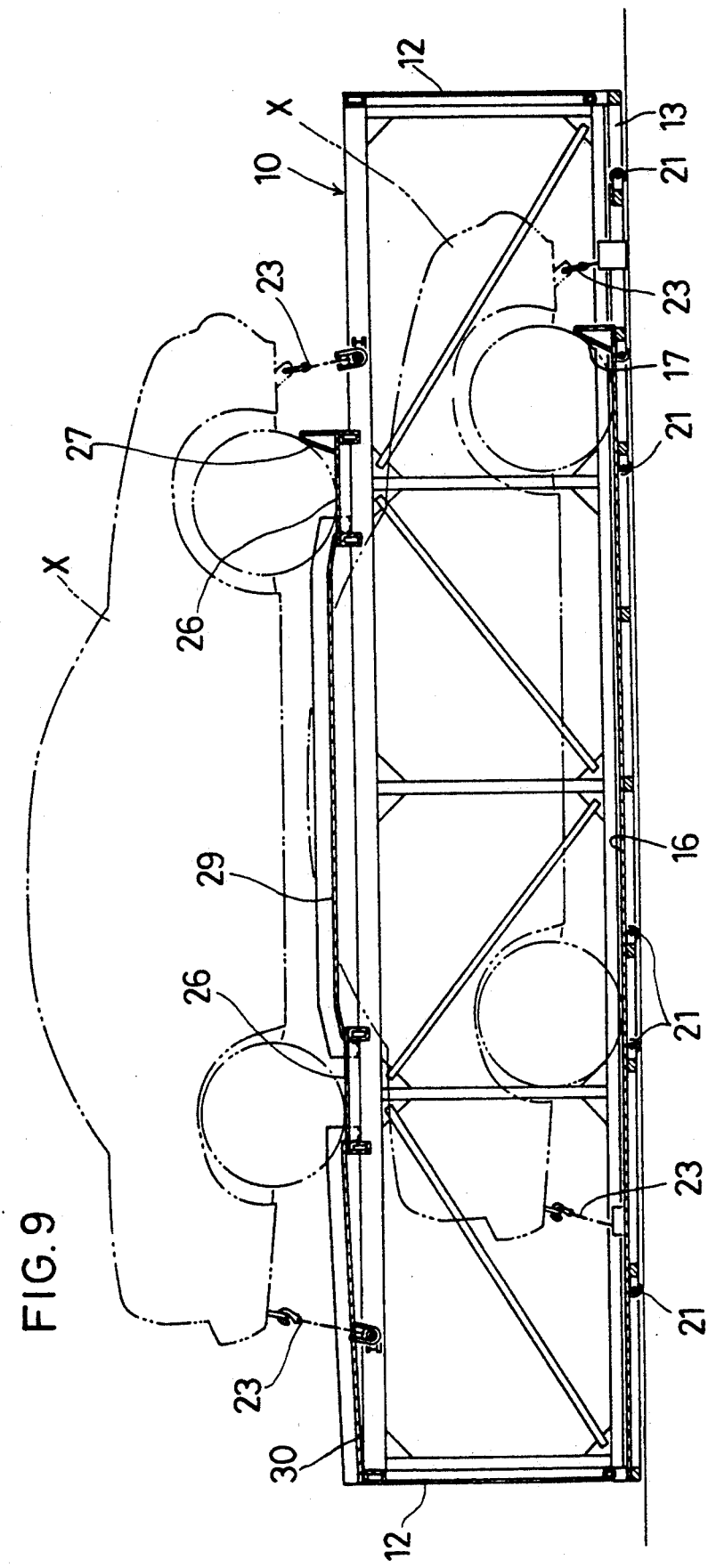
FIG. 9 is a side view showing the car loading apparatus loaded with cars.

FIG. 1 is a schematic view showing the entire structure of a first embodiment of the invention. A box frame 10 comprises longitudinally extending rectangular side frames 11, rectangular end frames 12 and a base frame 13 supporting the frames 11 and 12.

These rectangular frames are trussed frames each comprising upper and lower parallel members with a plurality of vertical and oblique frames provided there-between. The frame 13 is in the shape of a rectangle and is provided at four corners thereof with square columns 14.

The base frame 13 is provided with two pairs of connecting frames 15 extending between the side frames 11, each pair being at location corresponding to the front or rear wheels of a car when it is loaded in position. Further, right and left car mounting frames 16 are mounted on the base frame 13 to extend longitudinally across the connecting frames 15 and an end of base frame 13 from which a car is to be moved into the apparatus. A stopper 17 is provided at the front end of each frame 16.

As shown in FIG. 3, the square column 14 at each of the four corners of the base frame 13 is provided with hinges 18 and 19. The side rectangular frames 11 and the end rectangular frames 12 are rotatably mounted on the base frame 13 by the hinges 18 and 19, respectively. When assembling the rectangular frames 11 and 12 into the box frame, they are fixed together at their top abutting ends by use of bolts 20. As shown in FIG. 1, four rollers 21 are mounted on each of the longitudinal frames of the base frame 13 so that the entire loading apparatus can be moved with cars mountd thereon.

The base frame 13 is provided near each end thereof with a pair of connecting rods 22 extending longitudinally between the connecting frame 15 and a lower horizontal frame member of each rectangular end frame 12. Lashing devices 23 are provided for lashing a car and have one end thereof connected to the connecting rods 22 (see FIG. 2).

FIGS. 4 and 5 show the details of the lashing device 23. As shown, it comprises a hook 231, a wire 232 and a ratchet winder 233. The winder 233 has a drum shaft 234, a ratchet 235 mounted on the drum shaft 234 and a stopper 236 in engagement with the ratchet 235. In order to take up the wire 232, the drum shaft 234 is rotated with a handle (not shown).

As shown in FIG. 1, the box frame 10 is provided with two connecting frames 24 extending between the top edges of the side rectangular frames 11 at locations corresponding to the front and rear wheels of the car to be mounted thereon. The connecting frames 24 are fixed to the box frame by bolts 25.

Four wheel support plates 26 are mounted on the connecting frames 24 so as to be located right under the front and rear wheels of the car. The plates 26 for the front wheels are provided with stoppers 27.

The wheel support plates 26 for the front wheels are each formed with two small holes 28 and those for the rear wheels are each formed with four small holes 28 for receiving leg portions of guide frames 29 and 30. The guide frames 29 are mounted between the wheel support plates 26 for the front wheels and those for the rear wheels, whereas the guide frames 30 are mounted between the wheel support plates 26 for the rear wheels and the rectangular rear end frame 12.

FIG. 2 is a perspective view showing the box frame 10 with most of its accessory parts removed to facilitate understanding of the structure of the box frame 10.

The car loading apparatus of this embodiment is used in the following manner.

First, as shown in FIG. 6, a car X is driven into the box frame 10 after the box frame 10 has been assembled outside a container C with the accessory parts for loading a car on the upper deck removed and with the rear rectangular end frame 12 laid flat on the ground. A car-guiding ramp way 31 is mounted against the rear end of the box frame 10 as shown.

To move the car X into the box frame 10, the car X is driven up the ramp way 31 into the box frame 10 and is stopped when it comes substantially to the center of the box frame 10. The car X is then lashed to the base frame 13 with the lashing devices 23. It is sufficient to provide at least two lashing devices provided at diagonally opposing corners of the car.

Next, the accessory parts for loading on the upper deck are mounted on the box frame 10 and a car X is moved onto the upper deck. For this purpose, it is necessary to mount the connecting frames 24 between the side rectangular frames 11, the wheel support plates 26 thereon and further the guide frames 29 and 30 on the wheel support plates 26. Further a car guide ramp way 32 of a predetermined length is put at one end thereof on the rear end rectangular frame 12 so as to extend obliquely.

Thereafter, a car is driven up the ramp way 32, onto the upper deck, and stopped at a predetermined position. It is then lashed to the box frame 10 with the lashing devices 23. It is necessary to provide at least two lashing devices at diagonally opposite sides of the car.

In lashing the cars with the lashing devices 23, if they are lashed only enough to keep them from moving, the top of the car on the upper deck will hit the top frame F of the entrance of the container C when the car-loading apparatus is moved thereinto with two cars loaded one over the other. This is because, as shown in FIG. 7, the frame F is at a height slightly lower than the effective height of the container.

Therefore, when lashing the car X on the upper deck, it is necessary to sufficiently compress its tires and the axle springs by tightly winding the wire 232 of each lashing device 23 with the ratchet winder 233 so that the top of the car X will be lower than the frame F.

Figure 10:
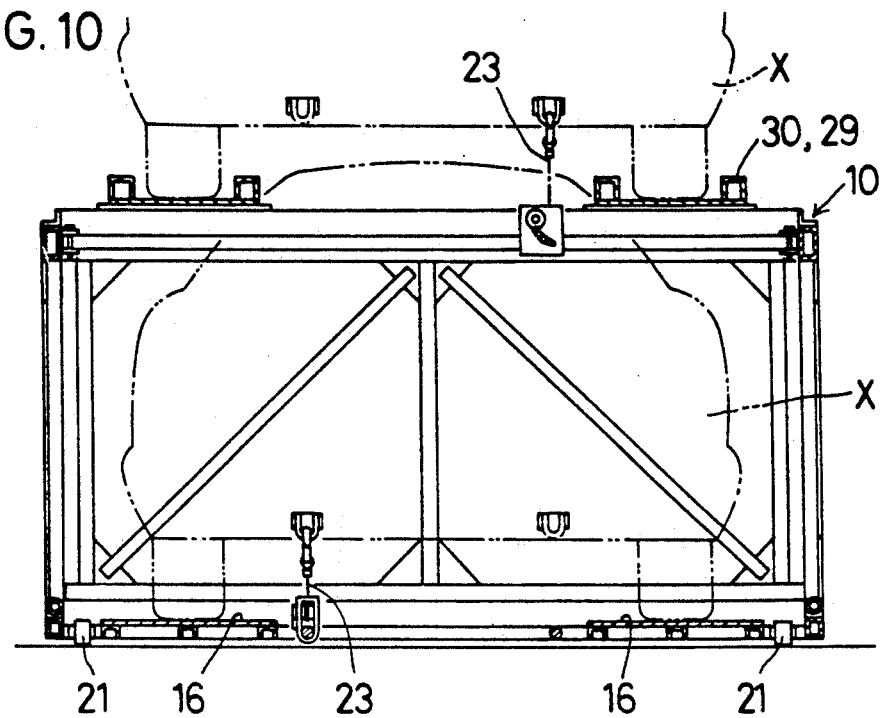
FIG. 10 is a front view of the car loading apparatus shown in FIG. 9.

FIGS. 9 and 10 show the cars thus lashed. The car on the upper deck can be lowered still further from the state shown.

When lashing is over, the ramp ways 31 and 32 are removed and the entire apparatus is pushed into the container C by human hands. This is possible because rollers 21 are provided on the bottom of the base frame 13. With this arrangement, a 40-foot container can be loaded with four cars in two rows as shown in FIG. 8.

As shown in FIG. 8, after putting the entire apparatus in the container C, a predetermined number of pressure rods 33 are pressed against the box frame 10 to prevent the loading apparatus from leaping about during transportation.

Figure 11:
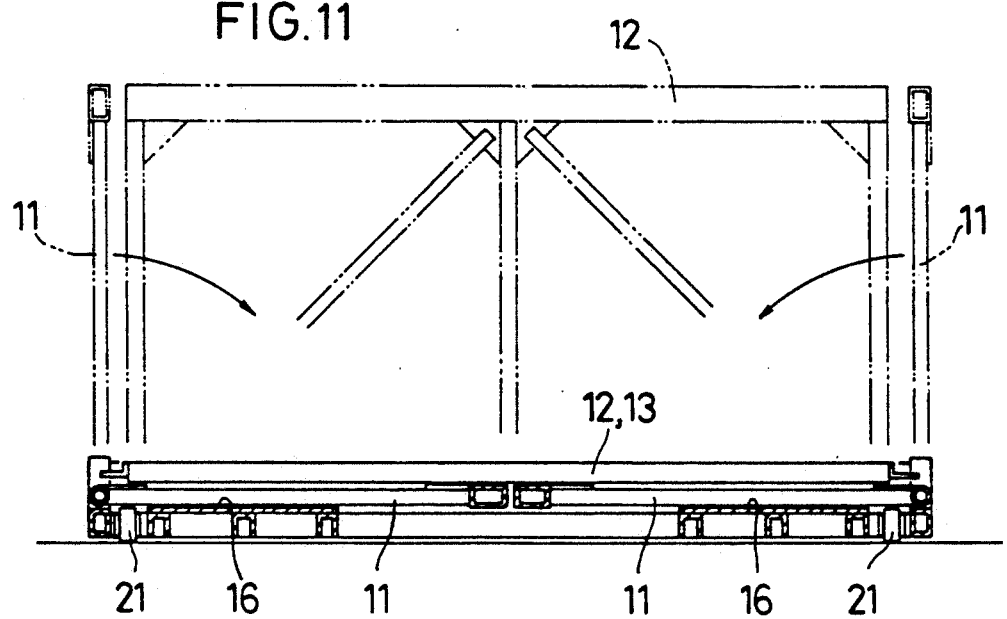
FIG. 11 is a view showing how the box frame is collapsed.

When the box frame 10 is not in use, it can be collapsed by removing the bolts 20 and lowering the side and end rectangular frames 11 and 12 inwardly as shown in FIG. 11. The loading apparatus thus collapsed is thin, easy to carry and take up little space for storage.

Figure 12:
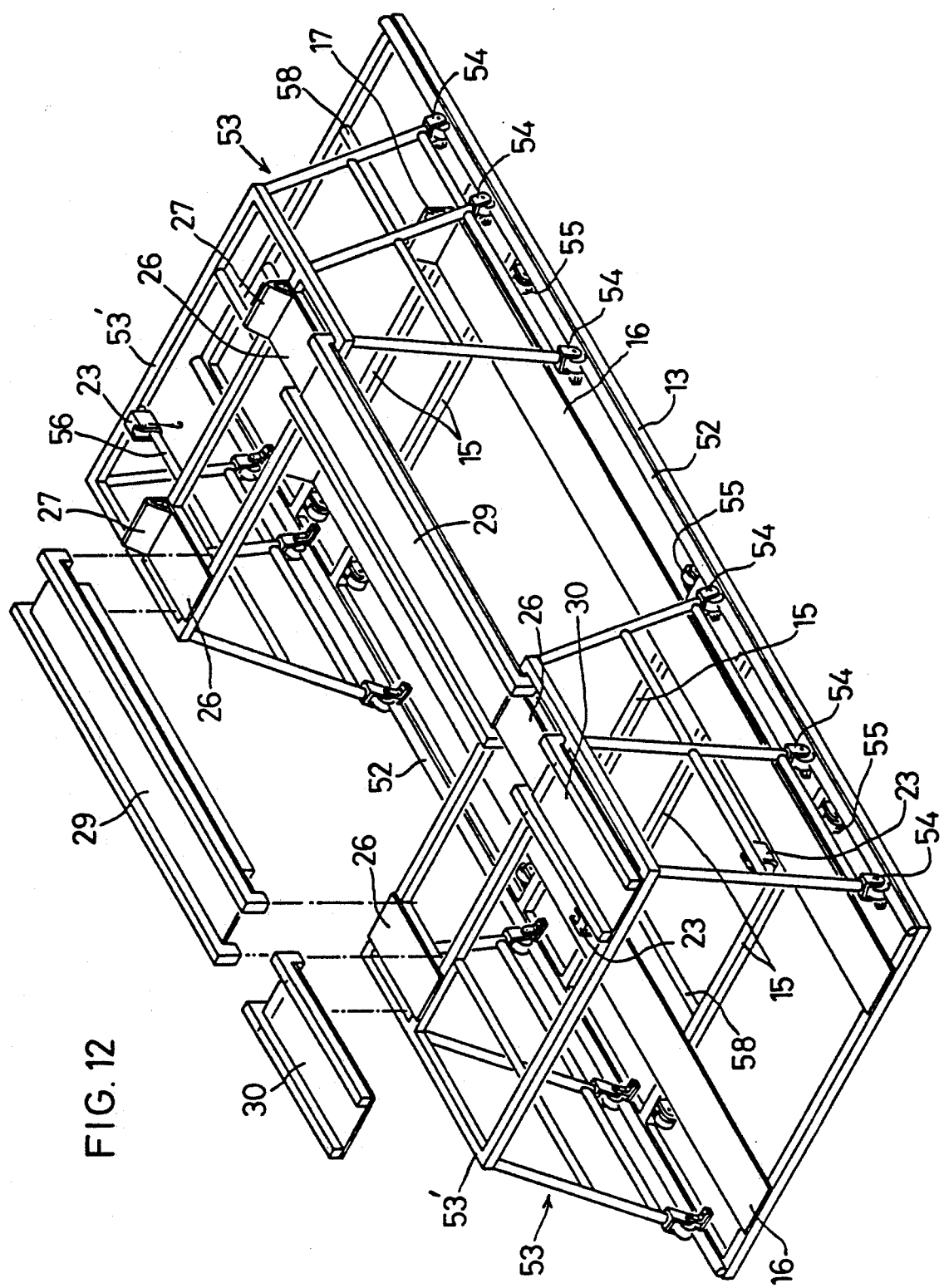
FIG. 12 is a shematic view of a second embodiment of the car loading apparatus of this invention.

FIG. 12 is a schematic view of the car loading apparatus of a second embodiment.

As shown, this car loading apparatus has a base frame 13 having sufficient length and width to carry a car. The base frame 13 is provided with two rails 52 extending longitudinally along both side edges thereof.

A pair of gantry frames 53 are mounted on the base frame 13 at positions corresponding to the positions of the front and rear wheels of a car carried on the base frame 13 by fixing a plurality of fixing devices 54 with rollers to the rails 52.

The base frame 13 is provided with connecting frames 15 extending between the side frames at positions corresponding to the positions of the front and rear wheels. Car-mounting frames 16 spaced apart from each other by a distance equal to the wheel tread are provided to extend longitudinally across the connecting frames 15.

Each car-mounting frame 16 is provided at its front end with a stopper 17 and has its rear end resting on a rear edge of the base frame 13. At least a pair of lashing devices 23 similar to those used in the first embodiment are mounted on connecting frames 58 provided perpendicular to the connecting frames 15 to lash the car at its diagonally opposite points.

A plurality of rollers 55 are provided on the side frames of the base frame 13 at equal longitudinal intervals so that the base frame 13 is movable.

Each gantry frame 53 has three legs at each side and a horizontal member connecting the legs at both sides and has the shape of a gate. The roller-carrying fixing devices 54 are secured to the bottom ends of the legs.

As shown in FIG. 14, the roller-carrying fixing devices 54 each comprise a U-shaped roller support 61, a roller 62, an L-shaped arm 63 secured to one side of the roller support 61, a flange 64 secured to one side of the rail 52, and a fixing member 65 comprising a bolt and a nut for fixing the flange 64.

As shown, the horizontal top frame 53' of each gantry frame 53 has a rectangular shape. Upper car-mounting frames, spaced apart from each other by a distance equal to the wheel tread, are laid across the horizontal frames 53' to extend longitudinally.

Each upper car-mounting frame comprises a wheel support plate 26 having a stopper 27, a guide frame 29 connected to the wheel support 26, another wheel support 26, and another guide frame 30.

The wheel supports 26 are connected to the respective horizontal frames 53'. The guide frames 29 and 30 are detachably mounted to the wheel supports.

At least a pair of lashing devices 23 for lashing the car are provided at positions corresponding to diagonally opposite positions of the car when loaded on the upper deck. Each of the lashing devices 23 is secured to a longitudinal connecting member 56 of each horizontal frame 53'.

Figure 13:
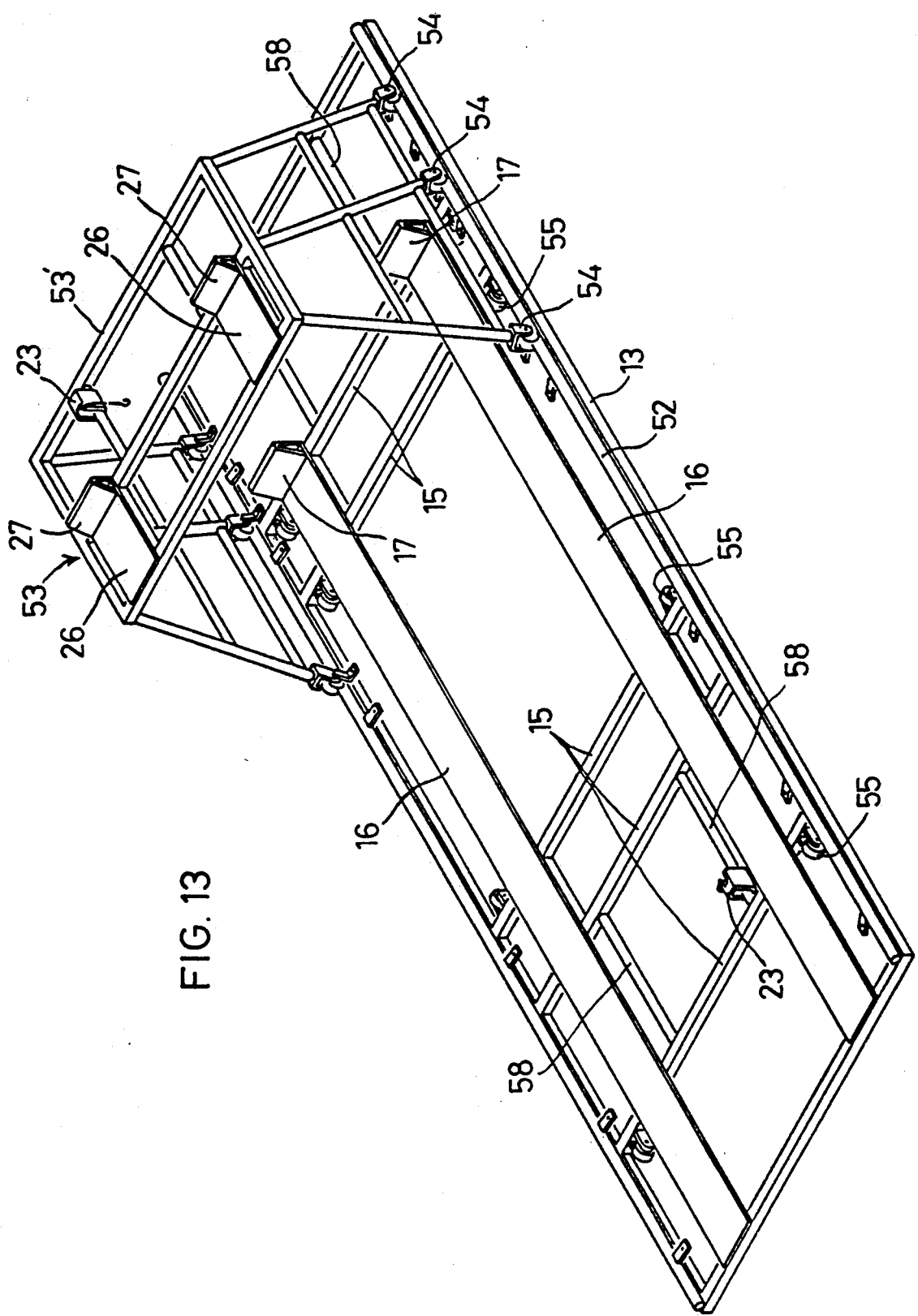
FIG. 13 is a perspective view showing the main structure of the second embodiment.

FIG. 13 is a perspective view showing the framework of the car loading apparatus shown in FIG. 12, with one of the gantry frames 3 and the accessory parts necessary for loading a car on the upper deck all removed.

Cars are loaded into a container by use of the car loading apparatus of this embodiment in the following manner.

First, a short ramp way 31 is set up against the base frame 13 outside a container C as shown in FIG. 15. Then a car X is driven onto the lower deck and lashed at a predetermined position by use of the lashing devices 23.

Thereafter, the front gantry frame 53 is secured to the rails 52 by means of the roller-carrying fixing devices 54.

In this case, the gantry frame is lifted with a fork lift or a crane, set on the rails 52, moved on the rails 2 by the rollers of the roller-carrying fixing devices 54 to a predetermined position and fixed. The gantry frames 53 may be mounted on the rails 52 before placing a car on the lower deck.

Next, as shown in FIG. 7, a car X is moved up onto the upper deck. In this case, the rear gantry frame 53 is set in a predetermined position in the same manner as with the front gantry frame 53 and then the upper deck car-mounting frames are mounted across both the gantry frames 53.

Further, a long ramp way 32 is placed against the rear gantry frame 53 and a car X is driven up onto the upper deck. The car is then lashed to the gantry frames 53 by use of at least two lashing devices 23 provided at diagonally opposite positions of the car to fix it in a predetermined position in the same manner as in the first embodiment.

In this embodiment, in order to facilitate the mounting of the gantry frames 53 on the base frame 13, rails 52 are mounted on the base frame 13 and roller-carrying fixing devices 54 are provided at the lower ends of the gantry frames 53. But the rails 52 and the rollers of the fixing devices 54 may be omitted. In such a case, the gantry frames 53 are fixed to the base frame 13 while holding them up in the air with a crane or the like.

Figure 17:
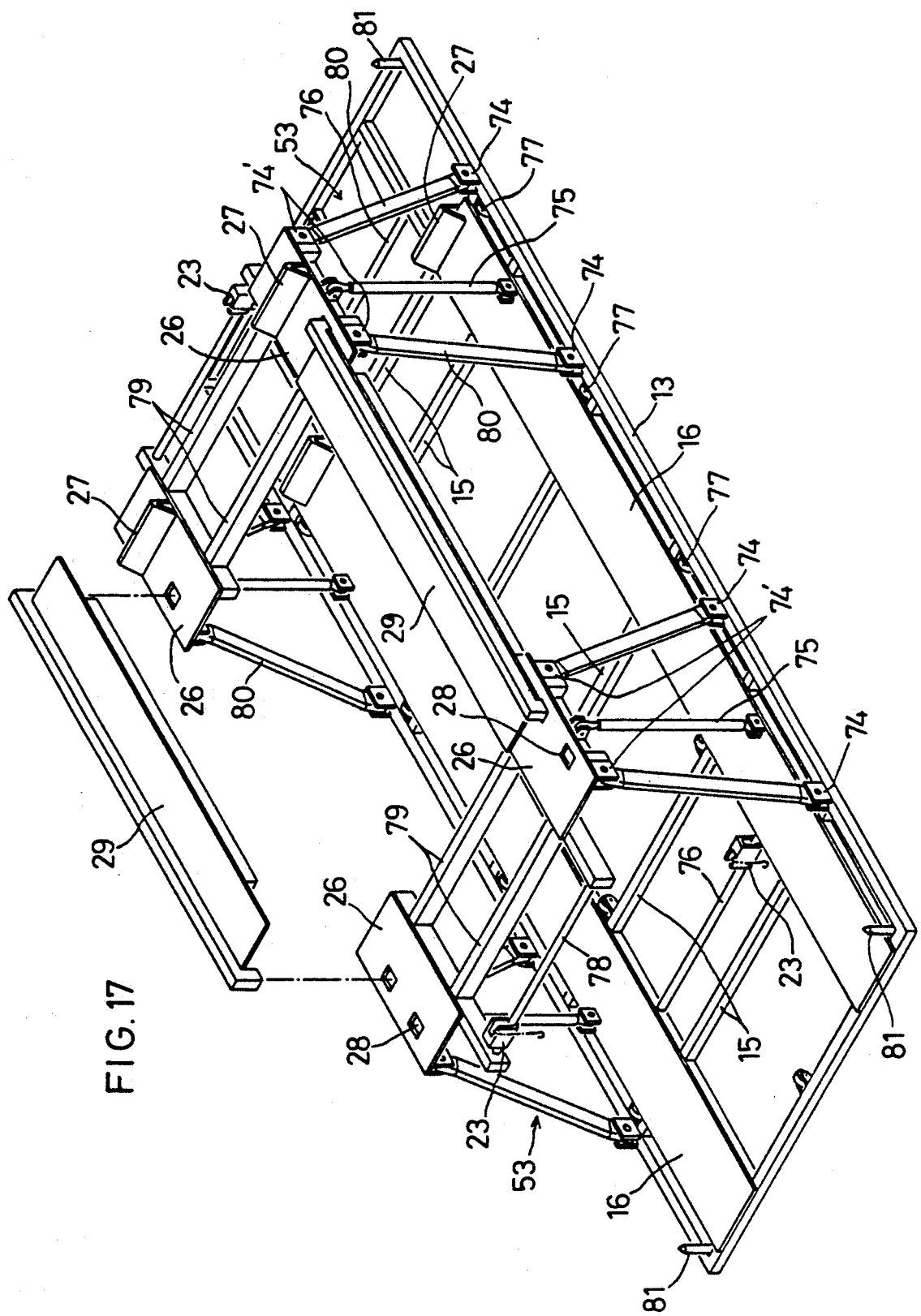
FIG. 17 is a schematic view of a third embodiment.

FIG. 17 is a shematic view showing the car loading apparatus of a third embodiment. The apparatus of this embodiment is basically of the same structure as the second embodiment but differs in some details. We shall therefore describe mainly the differences between the third and the second embodiments, while only briefly describing the basic of the third embodiments.

In this embodiment, too, there is provided a base frame 13. A pair of gantry frames 53 are fixedly mounted on a base frame 13 by means of fixing members 74 of the rotatable hinge type.

The gantry frames, 53 are gate-shaped frames each of which comprises a horizontal frame 79 and upright frames 80 which are connected together by rotatable hinge type fixing members 74', which are, as will be described later, detachably mounted by bolts and nuts.

To stabilize the gantry frames 53 when assembled as shown, vertical rods 75 are provided. Their bottom ends are in the form of rotatable hinges and their top ends have a detachable structure.

Opposing sides of the base frame 13 are connected together through connecting frames 15 at predetermined points. Right and left car-mounting frames 16, spaced apart a distance equal to the wheelbase dimension, are mounted on the base frame 13 to extend longitudinally. Numeral 27 designates a stopper.

A pair of lashing devices 23 are provided on two of the connecting rods 76 at diagonally opposite positions with respect to the car to be mounted. Rollers 77 are provided on the base frame 13 at predetermined locations.

Right and left upper deck car-mounting frames, spaced apart from each other by a distance equal to the wheelbase dimension, are mounted on the gantry frames 53 in the same manner as in the second embodiment. Each car-mounting frame comprises a wheel support 26 having a stopper 27, a guide frame 29 and another wheel support 26.

The rear wheel supports 26 are formed with small holes 28 for engaging the front end of a ramp way, as will be described later.

Each gantry frame 53 has a connecting rod 78 extending between overhanging frames provided at both sides of the horizontal frames 79. At least a pair of lashing devices 23 for lashing the car on the upper deck are mounted on the respective connecting rods 78 at positions diagonally opposite to each other with respect to the car. The lashing devices 23 are used to lower the height of the car on the upper deck as with the lashing devices used in the other embodiments.

Figure 18:
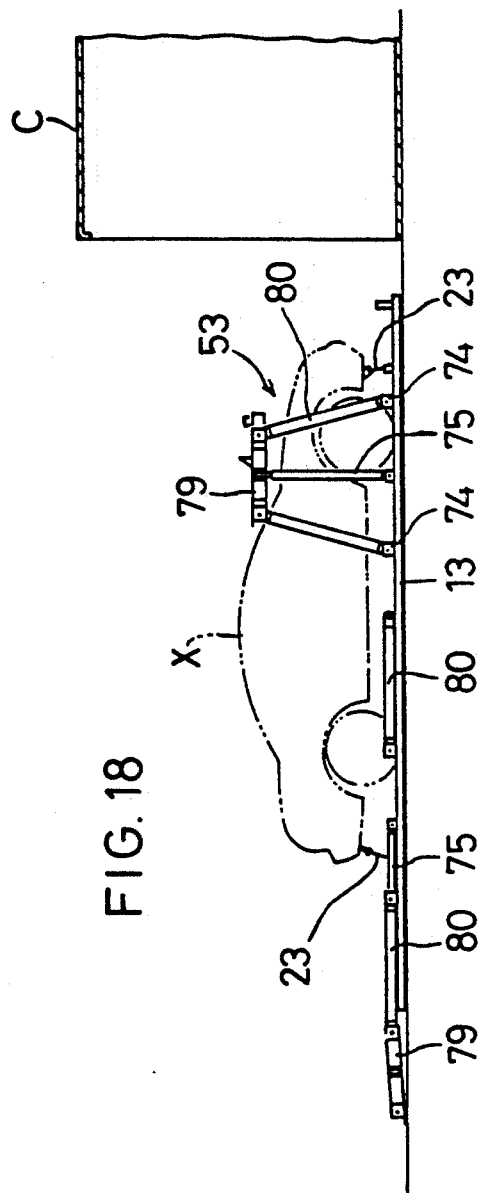
FIGS. 18 and 19 are views showing how cars are loaded.
Figure 19:
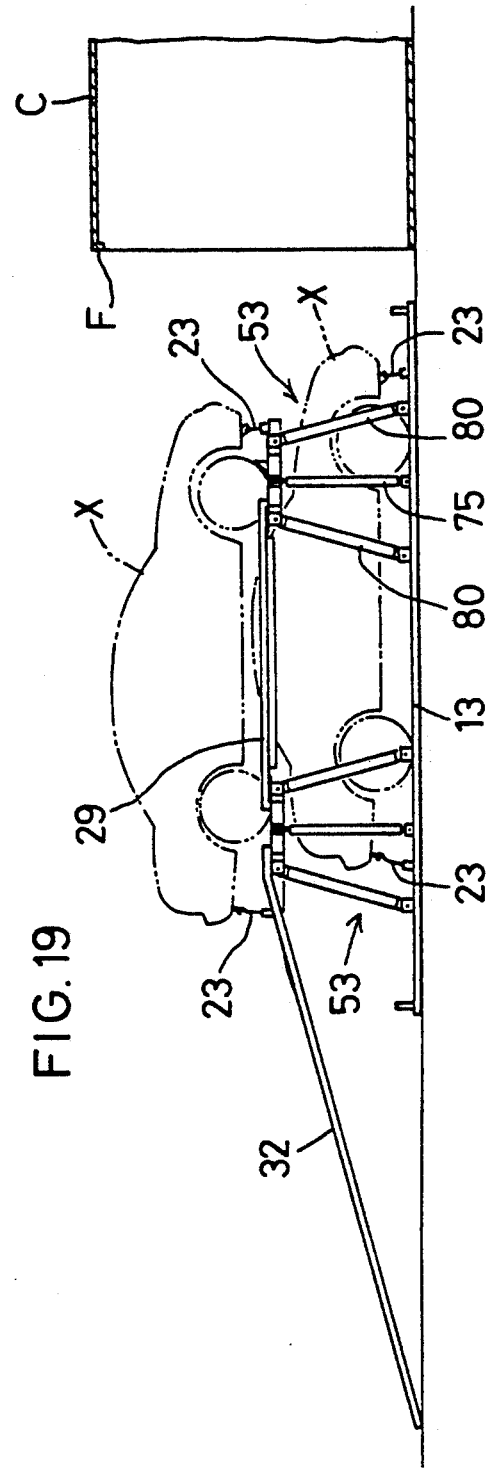

Cars X are loaded into a container by use of the car-loading apparatus of this embodiment following the steps shown in FIGS. 18 and 19.

First, as shown in FIG. 18, before loading a car X, the upright frames 80 of one of the gantry frames 53 are lowered by detaching the fixing members 74 and the vertical rods 75. At that time, the horizontal frames 79 are kept connected to the upright frames 80 at one side and these frames are lowered by pivoting. The other gantry frame 53 is kept in the assembled condition.

A car X is driven onto the car-mounting frames 16 from the side of the gantry frame 53 which has been collapsed, and stopped at a predetermined position. Thereafter, the car X is lashed with the lashing devices 23.

Next, the rear gantry frame 53 is assembled as shown in FIG. 19, and the guide frames 29 of the upper car-mounting frames are mounted on the pair of gantry frames 53. Further, the ramp way 32 is placed on the rear gantry frame 53 in the same manner as in the second embodiment.

Thereafter, a car X is driven up onto the upper deck, placed at a predetermined position and lashed with the lashing devices 23 to lower the height of the car to prevent the car from hitting the entrance frame F of the container C.

When the cars are thus lashed, the ramp way 32 is removed and the car-loading apparatus, loaded with the two cars in two tiers, is pushed into the container by human hands in the same manner as in the other embodiments.

Though not shown, the upper surface of the base frame may be made flush with the inner floor surface of the container surface by placing the base frame on an adjusting plate so that the car-loading apparatus can be moved into the container smoothly.

One of the advantages of this embodiment is that the gantry frames 53 mounted on the base frame 13 can be disassembled and collapsed flat on the base frame 13.

Figure 20:
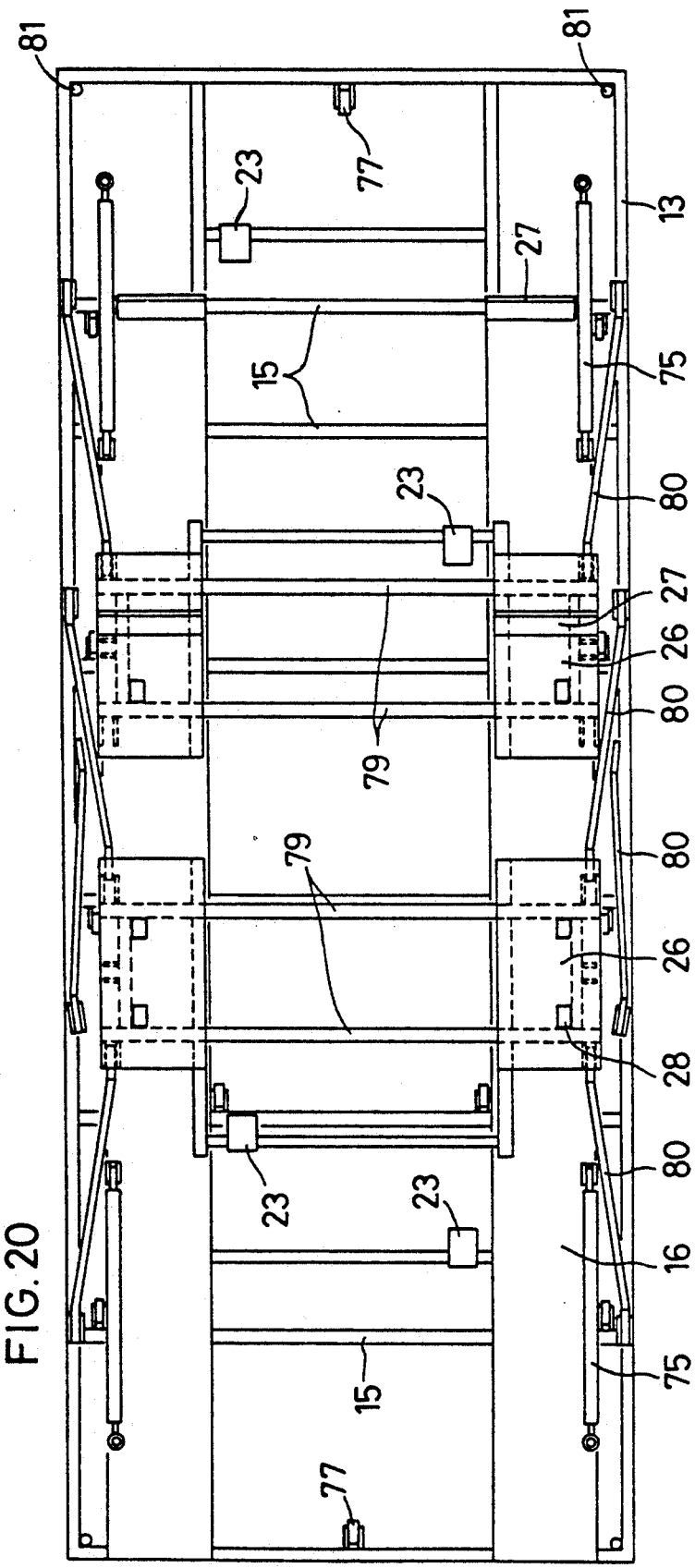
FIG. 20 is a plan view showing a gantry frame in the collapsed state.
Figure 21:
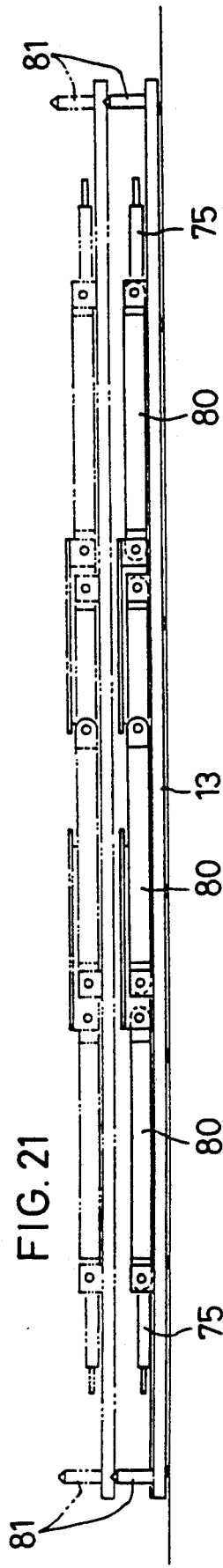
FIG. 21 is a side view of two loading apparatuses, collapsed and piled one upon the other.
Figure 22:
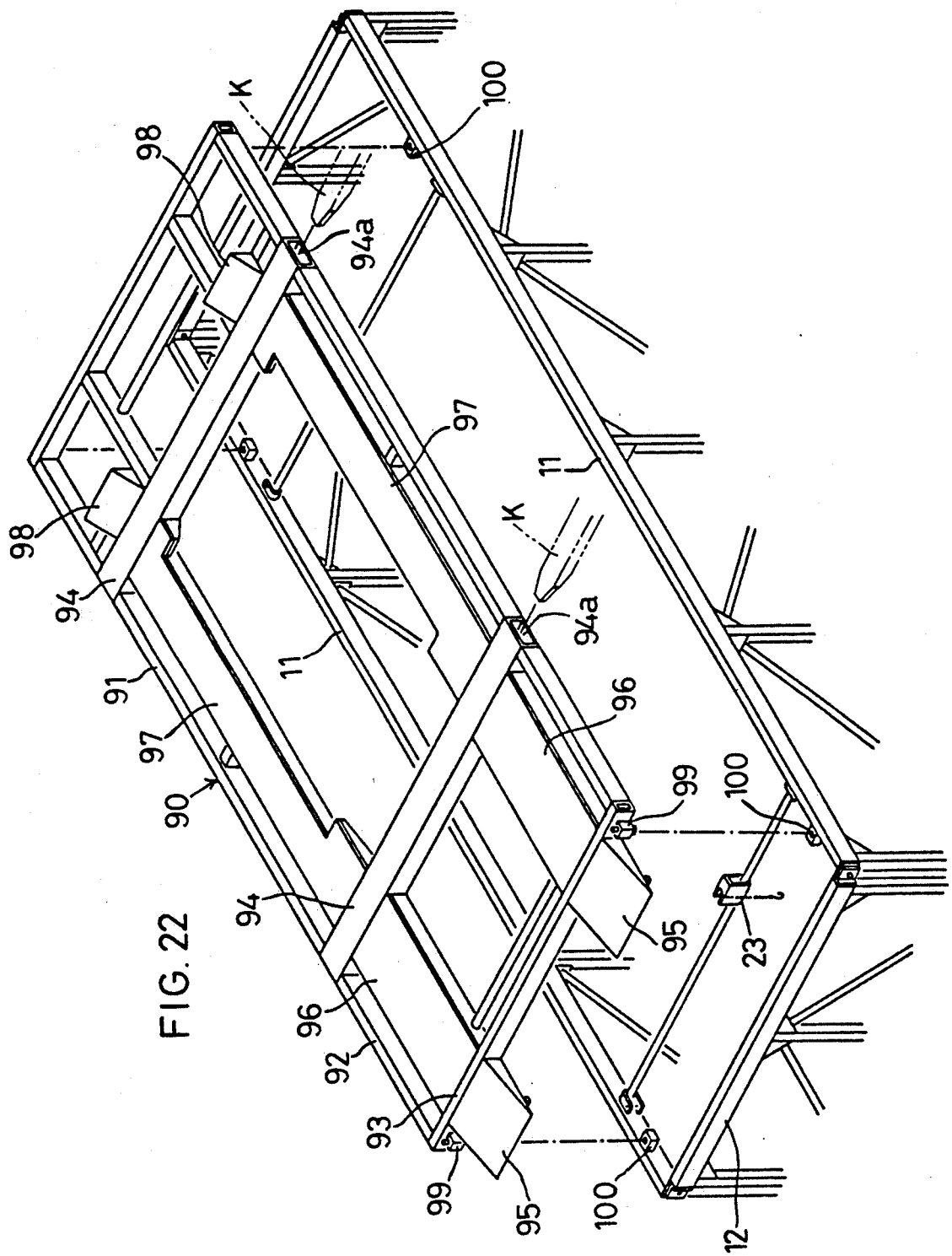
FIG. 22 is a schematic perspective view of an embodiment in which an integrally formed upper car loading frame is used.

The gantry frames in the collapsed state are shown in FIG. 20. As is apparent from this figure, when not in use, the car loading apparatus can be transported with all the members other than the ramp way 32 and the guide frames 30 kept attached thereto. Also, as shown in FIG. 21, two or more loading apparatus can be piled one upon another, utilizing the guide rods 81. Thus, a plurality of loading apparatus can be stored in less space.

FIGS. 22 to 27 show a fourth embodiment in which an integral car loading frame is used in place of the connecting frames 24, wheel supports 26 and guide frames 29 and 30 which are employed in the first embodiment to place a car on the upper deck of the box frame.

The upper car loading frame 90 comprises an outer frame 91, lateral frames 94 and guide frames 96 and 97, which are connected together as a single unit. The outer frame 91 is rectangular in shape and comprises longitudinally extending side frames and end frames provided at both ends thereof.

The lateral frames 94 extend across the side frames 92 at positions corresponding to the positions of the front and rear wheels of the car to be mounted thereon. The lateral frames 94 are formed with openings 94a at least in both ends thereof so that the frame 90 can be lifted by a forklift with its forks inserted in the openings 94a.

Apron guide plates 95 are secured to one of the end frames 93 of the outer frame 91 so that a car can easily climb over the end frame 93 when carried onto the frame 90. The guide frames 96 and 97 extend from the respective apron guide plates 95 in the longitudinal direction of the outer frame 91 at a spacing equal to the wheelbase dimension of the car to be loaded.

The guide frames 97 are partially cut out to prevent them from hitting the head of the car on the lower deck. A wheel stopper 98 is provided on the extension of each guide frame 97.

Engaging members 99 are secured to the outer surface of the end frames 93 of the outer frame 91 at four corners thereof to set the outer frame 91 in a fixed position on the rectangular side frames 11 of the box frame 10. For this purpose, engaging members 100 are provided on the rectangular frames 11 at locations corresponding to the engaging members 99.

Otherwise, the structure of the box frame is the same as that of the first embodiment.

In this embodiment, a car is loaded on the lower deck in exactly the same manner as in the first embodiment. Thus, its description is omitted.

When loading a car on the upper deck by use of the car loading frame 90, forks of a forklift are inserted in the openings 94a formed in the lateral frames 94.

Figure 23A:
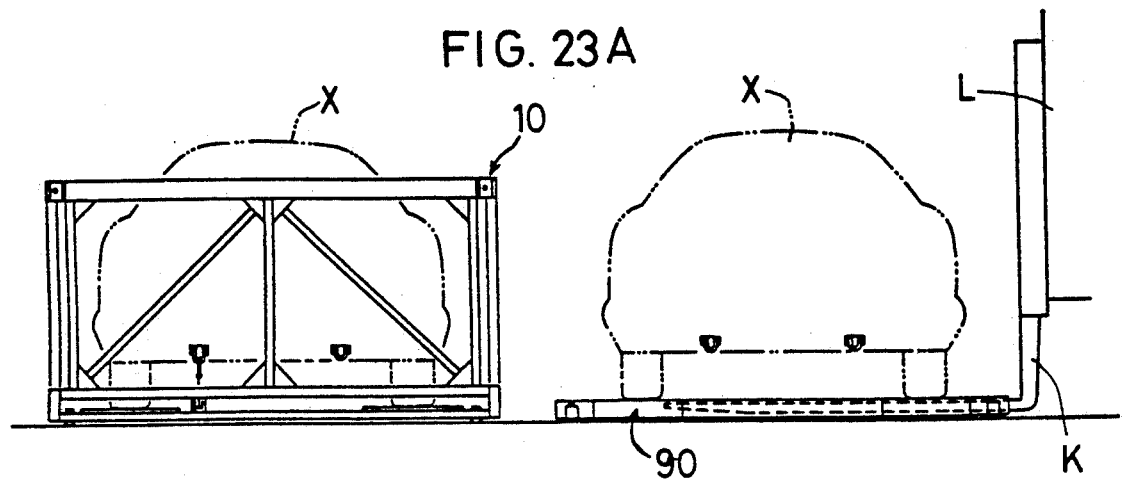
FIG. 23a and 23b are views showing how a car can be moved onto an upper car mounting frame positioned on the ground, and how the loading frame thus carrying the car can be lifted and placed on the box frame.

Before inserting the forks K of the forklift L, a car X is moved onto the car loading frame 90 placed on the ground level as shown in FIG. 23A.

Figure 23B:
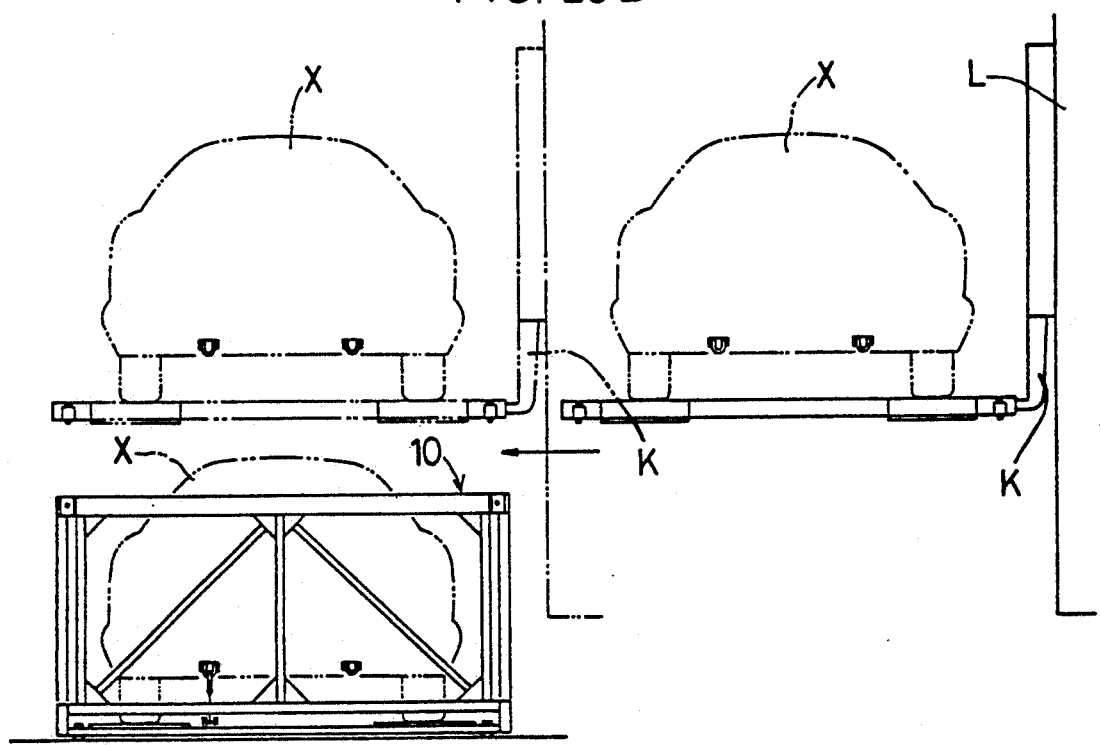

After mounting the car X and inserting the forks K of the forklift L, the upper car loading frame 90 is lifted up and moved to a position directly above the box frame 10 as shown in FIG. 23B. Then the car loading frame 90 is placed on the box frame 10 so that the engaging members 99 of the car mounting frame 40 will engage the engaging members 100 of the box frame 10.

FIGS. 25 and 26 are views seen from one side and one end of the car loading frame thus placed on the box frame, respectively. In this state, the car loaded on the upper deck is lashed at diagonally opposite points in the same manner as in the first embodiment.

In this embodiment, a forklift is used to lift the car loading frame. But any other lifting device such as a crane may be used to lift it.

What is claimed is:

1. A method for loading a container with cars, comprising the steps of:

assembling, outside of the container, a substantially rectangular box-shaped car loading apparatus having a base frame and an upper car loading frame spaced above said base frame;

moving a first car into a first predetermined position on said base frame of said car loading apparatus while said car loading apparatus is outside of the container;

moving a second car into a second predetermined position on said upper car loading frame of said car loading apparatus while said car loading apparatus is outside of the container;

lashing down the second car to said upper car loading frame of said car loading apparatus in such a manner as to forcibly compress compressible components of the second car to lower the overall height of the second car;

moving said car loading apparatus into the container after said car loading apparatus has been assembled, the first car has been moved into said first predetermined position on said base frame, and the second car has been moved into said second predetermined position on said upper car loading frame and lashed down to said upper car loading frame;

wherein said step of moving the first car into said first predetermined position on said base frame is performed prior to said step of moving the second car into said second predetermined position on said upper car loading frame;

wherein said step of assembling said car loading apparatus comprises providing side frames, assembling said base frame with said side frames prior to moving the first car into said first predetermined position on said base frame, and assembling said upper car loading frame on said side frames above said base frame after the first car has been moved into said first predetermined position on said base frame;

wherein said step of assembling said car loading apparatus further comprises providing end frames, and assembling said end frames onto longitudinal ends of said side and base frames such that one of said end frames can be pivoted into a substantially horizontal position so as to open one end of said car loading apparatus; and wherein said step of moving the first car into said first predetermined position on said base frame comprises moving the first car through the open end of said car loading apparatus.

2. A method for loading a container with cars, comprising the steps of:

assembling, outside of the container, a substantially rectangular box-shaped car loading apparatus having a base frame and an upper car loading frame spaced above said base frame;

moving a first car into a first predetermined position on said base frame of said car loading apparatus while said car loading apparatus is outside of the container;

moving a second car into a second predetermined position on said upper car loading frame of said car loading apparatus while said car loading apparatus is outside of the container;

lashing down the second car to said upper car loading frame of said car loading apparatus in such a manner as to forcibly compress compressible components of the second car to lower the overall height of the second car;

moving said car loading apparatus into the container after said car loading apparatus has been assembled, the first car has been moved into said first predetermined position on said base frame, and the second car has been moved into said second predetermined position on said upper car loading frame and lashed down to said upper car loading frame;

wherein said step of moving the first car into said first predetermined position on said base frame is performed prior to said step of moving the second car into said second predetermined position on said upper car loading frame;

wherein said step of assembling said car loading apparatus comprises providing side frames, assembling said base frame with said side frames prior to moving the first car into said first predetermined position on said base frame, and assembling said upper car loading frame on said side frames above said base frame after the first car has been moved into said first predetermined position on said base frame; and wherein said step of moving the second car onto said upper car loading frame is performed prior to assembly of said upper car loading frame on said side frames.

3. A method for loading a container with cars, comprising the steps of:

assembling, outside of the container, a substantially rectangular box-shaped car loading apparatus having a base frame and an upper car loading frame spaced above said base frame;

moving a first car into a first predetermined position on said base frame of said car loading apparatus while said car loading apparatus is outside of the container;

moving a second car into a second predetermined position on said upper car loading frame of said car loading apparatus while said car loading apparatus is outside of the container;

lashing down the second car to said upper car loading frame of said car loading apparatus in such a manner as to forcibly compress compressible components of the second car to lower the overall height of the second car;

moving said car loading apparatus into the container after said car loading apparatus has been assembled, the first car has been moved into said first predetermined position on said base frame, and the second car has been moved into said second predetermined position on said upper car loading frame and lashed down to said upper car loading frame;

wherein said step of assembling said car loading apparatus comprises providing side frames, assembling said base frame with said side frames prior to moving the first car into said first predetermined position on said base frame, and assembling said upper car loading frame on said side frames above said base frame after the first car has been moved into said first predetermined position on said base frame;

wherein said step of assembling said car loading apparatus further comprises providing end frames, and assembling said end frames onto longitudinal ends of said side and base frames such that one of said end frames can be pivoted into a substantially horizontal position so as to open one end of said car loading apparatus; and wherein said step of moving the first car into said first predetermined position on said base frame comprises moving the first car through the open end of said car loading apparatus.

4. A method as recited in claim 3, wherein said step of lashing down the second car to said upper car loading frame comprises:

providing at least two lashing devices, each of which has a cable and a cable take-up mechanism, by connecting each of the cables between the second car and the upper car loading frame at different locations on said car, respectively; and taking up each of the cables with said cable take-up mechanism to compress the compressible components of the second car.

5. A method as recited in claim 4, wherein said compressible components include suspension springs and tires.

6. A method as recited in claim 4, wherein said step of moving the first car into said first predetermined position on said base frame is performed prior to said step of moving the second car into said second predetermined position on said upper car loading frame.

7. A method for loading a container with cars, comprising the steps of:
- assembling, outside of the container, a substantially rectangular box-shaped car loading apparatus having a base frame and an upper car loading frame spaced above said base frame;
- moving a first car into a first predetermined position on said base frame of said car loading apparatus while said car loading apparatus is outside of the container;
- moving a second car into a second predetermined position on said upper car loading frame of said car loading apparatus while said car loading apparatus is outside of the container;
- lashing down the second car to said upper car loading frame of said car loading apparatus in such a manner as to forcibly compress compressible components of the second car to lower the overall height of the second car;
- moving said car loading apparatus into the container after said car loading apparatus has been assembled, the first car has been moved into said first predetermined position on said base frame, and the second car has been moved into said second predetermined position on said upper car loading frame and lashed down to said upper car loading frame;
- wherein said step of assembling said car loading apparatus comprises providing side frames, assembling said base frame with said side frames prior to moving the first car into said first predetermined position on said base frame, and assembling said upper car loading frame on said side frames above said base frame after the first car has been moved into said first predetermined position on said base frame; and
- wherein said step of moving the second car onto said upper car loading frame is performed prior to assembly of said upper car loading frame on said side frames.

* * * * *